United States Patent
Siangchaew et al.

(10) Patent No.: US 11,127,421 B1
(45) Date of Patent: Sep. 21, 2021

(54) HEAT-ASSISTED MAGNETIC RECORDING (HAMR) WRITE HEAD WITH IMPROVED CORROSION RESISTANCE AND METHOD FOR MAKING THE HEAD

(71) Applicant: Western Digital Technologies, Inc., San Jose, CA (US)

(72) Inventors: Krisda Siangchaew, Nonthaburi (TH); Barry Cushing Stipe, San Jose, CA (US); Nattaporn Khamnualthong, Nonthaburi (TH)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/170,435

(22) Filed: Feb. 8, 2021

Related U.S. Application Data

(60) Provisional application No. 63/058,659, filed on Jul. 30, 2020.

(51) Int. Cl.
*G11B 5/39* (2006.01)
*G11B 5/02* (2006.01)
*G11B 13/08* (2006.01)
*G11B 5/60* (2006.01)

(52) U.S. Cl.
CPC ............. *G11B 5/3967* (2013.01); *G11B 5/02* (2013.01); *G11B 5/6088* (2013.01); *G11B 13/08* (2013.01)

(58) Field of Classification Search
CPC ... G11B 5/3106; G11B 5/4836; G11B 5/3103; G11B 2005/0021; G11B 5/314; G11B 5/3163; G11B 5/40; G11B 5/6088; G11B 2005/0005; G11B 5/1278

USPC .............................. 360/59, 313, 75
See application file for complete search history.

(56) References Cited

U.S. PATENT DOCUMENTS

| | | |
|---|---|---|
| 6,163,442 A | 12/2000 | Gill et al. |
| 7,137,190 B2 | 11/2006 | Hsiao et al. |
| 8,705,325 B2 | 4/2014 | Matsumoto |
| 8,902,720 B1 | 12/2014 | Schreck et al. |
| 9,036,307 B1 | 5/2015 | Hoshiya et al. |
| 10,083,713 B1 | 9/2018 | Simmons et al. |
| 10,748,561 B1* | 8/2020 | Hwang ................ G11B 5/4826 |

OTHER PUBLICATIONS

G. Ertl, M. Huber, and N. Thiele, Z. Naturforsch, "Formation and decomposition of nitrides on iron surfaces" 34a, 30-39 (1979).

* cited by examiner

*Primary Examiner* — Nabil Z Hindi
(74) *Attorney, Agent, or Firm* — Thomas R. Berthold

(57) ABSTRACT

A heat-assisted magnetic recording (HAMR) write head has a write pole with a chemically-passivated end that substantially prevents oxidation and thus improves corrosion resistance of the write pole. The write pole and near-field transducer (NFT) are supported on a slider and have their ends in a window region of the slider's disk-facing surface. The outer surface region of the write pole is chemically-passivated, preferably by exposure to a nitrogen plasma. The nitrogen plasma has no effect on the NFT end or on the magnetoresistive read head, which is protected because it is located in a non-window region of the slider's disk-facing surface. An optically transparent protective film is formed in the window over the passivated write pole end and NFT end.

21 Claims, 7 Drawing Sheets

HEAT-ASSISTED MAGNETIC RECORDING (HAMR) WRITE HEAD WITH IMPROVED CORROSION RESISTANCE AND METHOD FOR MAKING THE HEAD

TECHNICAL FIELD

This invention relates generally to a heat-assisted magnetic recording (HAMR) disk drive, in which data are written while the magnetic recording layer on the disk is at an elevated temperature, and more specifically to an improved HAMR write head.

BACKGROUND

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

In a typical HAMR write head, light from a laser diode is coupled to a waveguide that guides the light to a near-field transducer (NFT) (also known as a plasmonic antenna). A "near-field" transducer refers to "near-field optics", wherein the passage of light is through an element with subwavelength features and the light is coupled to a second element, such as a substrate like a magnetic recording medium, located a subwavelength distance from the first element. The NFT is typically located at the gas-bearing surface (GBS) of the gas-bearing slider that also supports the read head and magnetic write pole and rides or "flies" above the disk surface. NFTs are typically formed of a low-loss metal (e.g., Au, Ag, Al, Cu) shaped in such a way to concentrate surface charge motion at a notch or tip located at the slider GBS when light is incident. Oscillating tip charge creates an intense near-field pattern that heats the recording layer on the disk. The magnetic write pole is then used to change the magnetization of the recording layer while it cools. Sometimes, the metal structure of the NFT can create resonant charge motion (surface plasmons) to further increase intensity and disk heating. For example, when polarized light is aligned with an E-antenna type of NFT, an intense near field pattern is created at the notch or tip of the E-antenna. Resonant charge motion can occur by adjusting the E-antenna dimensions to match a surface plasmon frequency to the incident light frequency. A NFT with a generally triangular output end, sometimes called a "nanobeak" type of NFT, is described in U.S. Pat. No. 8,705,325 B2. In this type of NFT an evanescent wave generated at a surface of the waveguide couples to surface plasmons excited on the surface of the NFT and a strong optical near-field is generated at the apex of the triangular output end.

SUMMARY

Because the write pole is located in close proximity (i.e., a few nanometers) to the recording layer, the write pole is also exposed to the heat generated on the recording layer surface. The write pole can also be heated by the NFT due to conduction or optical coupling. Under elevated temperature, the write pole can easily be oxidized from interacting with oxygen in the environment. The corroded write pole reduces the write performance of the disk drive.

Embodiments of this invention relate to a HAMR write head with a write pole that has a chemically-passivated end that substantially prevents oxidation and thus improves corrosion resistance of the write pole. In one embodiment a window is formed on the disk-facing surface of the slider that includes the write pole end and NFT end, but excludes the magnetoresistive read head. The write pole end and NFT end in the window are then exposed to a nitrogen plasma while the magnetoresistive read head remains protected from the plasma. The outer surface region of the write pole becomes passivated with nitrogen and iron nitrides. However, the nitrogen plasma has no effect on the NFT end and the protected read head. An optically transparent protective film is then formed in the window over the passivated write pole end and NFT end.

For a fuller understanding of the nature and advantages of the present invention, reference should be made to the following detailed description taken together with the accompanying figures.

DETAILED DESCRIPTION

Figure 1:
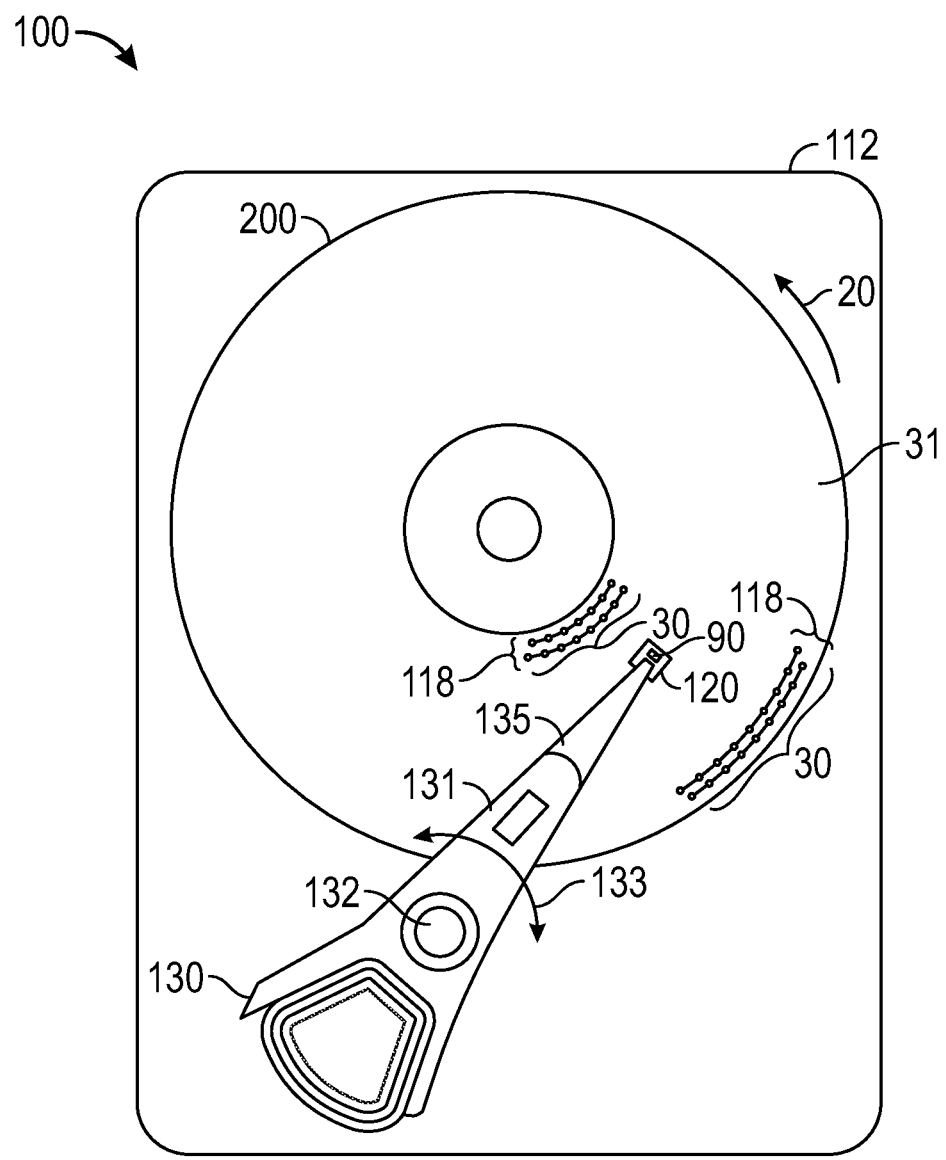
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with the magnetic recording layer 31 patterned into discrete data islands 30 of magnetizable material arranged in radially-spaced circular tracks 118. Only a few representative islands 30 and representative tracks 118 near the inner and outer diameters of disk 200 are shown. However, instead of the bit-patterned-media (BPM) shown with discrete data islands 30 in FIG. 1, the HAMR disk drive may instead use disks in which the recording layer 31 is a conventional continuous magnetic recording layer of magnetizable material.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 200 and enables it to "pitch" and "roll" on the gas-bearing, typically air or helium, generated by the disk 200 as it rotates in the direction of arrow 20. The slider 120 supports the HAMR head (not shown), which includes the HAMR write head and a magnetoresistive read head. The HAMR write head includes an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
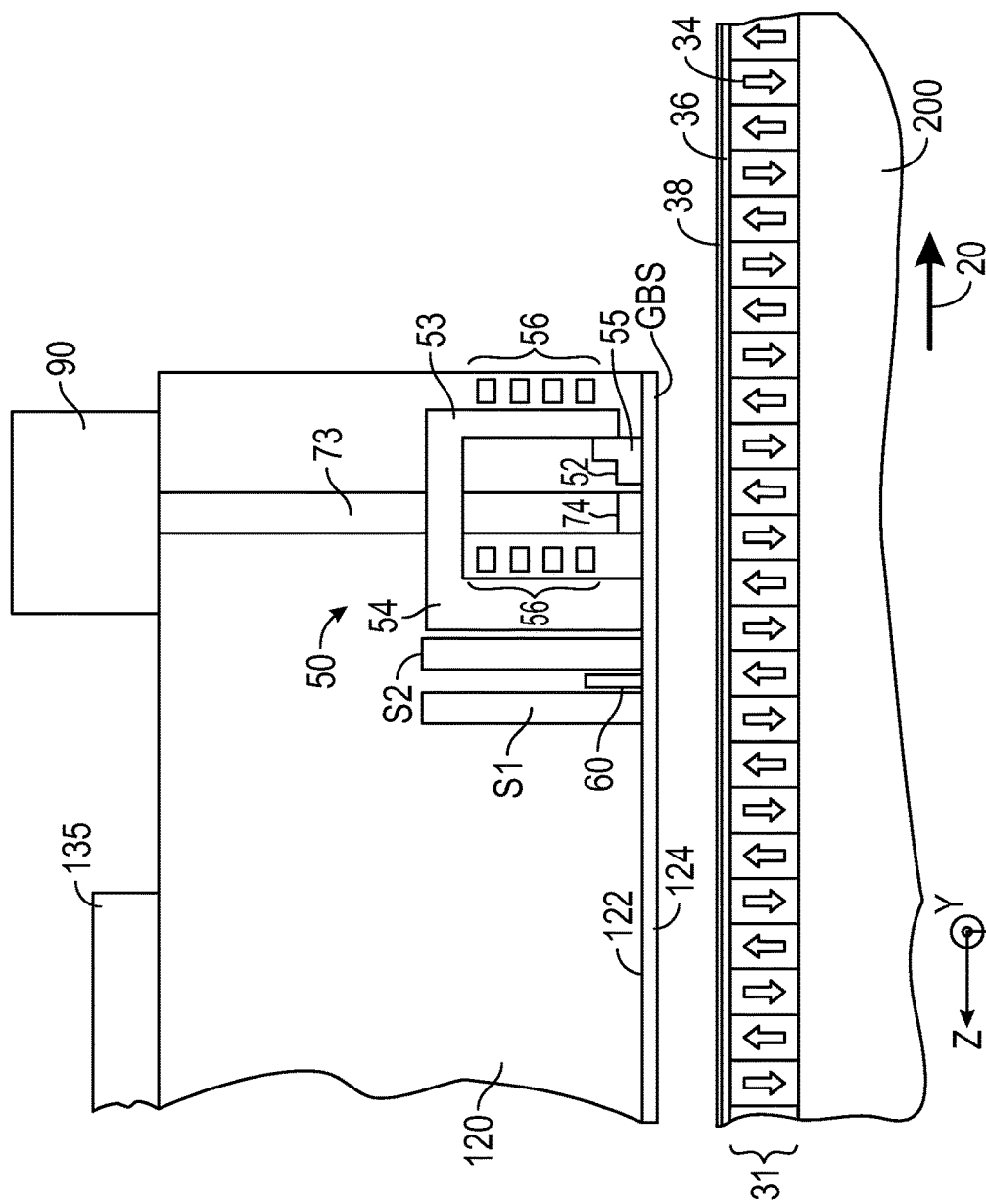
FIG. 2 depicts a sectional view, not drawn to scale because of the difficulty in showing the very small features, of a gas-bearing slider for use in HAMR disk drive and a portion of a HAMR disk according to the prior art.

In the following drawings, the X direction denotes a direction perpendicular to the gas-bearing surface (GBS) of the slider, the Y direction denotes a track width or cross-track direction, and the Z direction denotes an along-the-track direction. FIG. 2 is a schematic cross-sectional view illustrating a configuration example of a HAMR head according to the prior art. In FIG. 2, the disk 200 is depicted with the recording layer 31 being a conventional continuous magnetic recording layer of magnetizable material with magnetized regions or "bits" 34. The disk includes an overcoat 36, typically formed of amorphous diamond-like carbon (DLC), and a liquid lubricant layer 38, typically perfluropolyether (PFPE).

The gas-bearing slider 120 is supported by suspension 135. The slider 120 has a recording-layer-facing surface 122 onto which an overcoat 124 is deposited. The overcoat 124 is typically a DLC overcoat with a thickness in the range of about 1 to 3 nm and whose outer surface forms the GBS of the slider 120. The slider 120 supports the magnetic write head 50, read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The NFT 74, also known as a plasmonic antenna, typically uses a low-loss metal (e.g., Au, Ag, Al or Cu) shaped in such a way to concentrate surface charge motion at a tip located at the slider GBS when light from the waveguide 73 is incident. Oscillating tip charge creates an intense near-field pattern, heating the recording layer 31. Sometimes, the metal structure of the NFT can create resonant charge motion (surface plasmons) to further increase intensity and heating of the recording layer. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52.

A semiconductor laser 90 is mounted to the top surface of slider 120. An optical waveguide 73 for guiding light from laser 90 to the NFT 74 is formed inside the slider 120. Materials that ensure a refractive index of the waveguide 73 core material to be greater than a refractive index of the cladding material may be used for the waveguide 73. For example, $Al_2O_3$ may be used as the cladding material and $TiO_2$, $Ta_2O_5$, $Nb_2O_5$, and $SiO_xN_y$ as the core material. Alternatively, $SiO_2$ may be used as the cladding material and $Nb_2O_5$, $Ta_2O_5$, $TiO_2$, $SiO_xN_y$, or Ge-doped $SiO_2$ as the core material. The waveguide 73 that delivers light to NFT 74 is preferably a single-mode waveguide.

As shown in FIG. 2, the write pole end 52 is located in close proximity, i.e. just a few nanometers, to the recording layer 31, the write pole end 52 is also exposed to the heat generated by the NFT 74 on the recording layer surface. The charge motion in the NFT metal also causes heating of the NFT, and this "self-heating", in addition to reducing the long-term reliability of the NFT, can degrade and oxidize the DLC overcoat on the slider. The write pole can also be heated by the NFT due to conduction or optical coupling. The elevated temperature and/or the degradation of the slider overcoat can cause the write pole end to become oxidized, which results in poor recording performance.

In embodiments of this invention a very thin outer region of the write pole end is chemically passivated, preferably by exposure to a nitrogen plasma, which substantially improves the corrosion resistance of the write pole end. Only a window region of the slider disk-facing surface, which includes both the NFT end and the write pole end but not the magnetoresistive read head, is exposed during the chemical passivation process. The window region contains an optically transparent protective film for the NFT end and write pole end that is different from the protective overcoat in the non-window region of the slider.

Figure 3A:
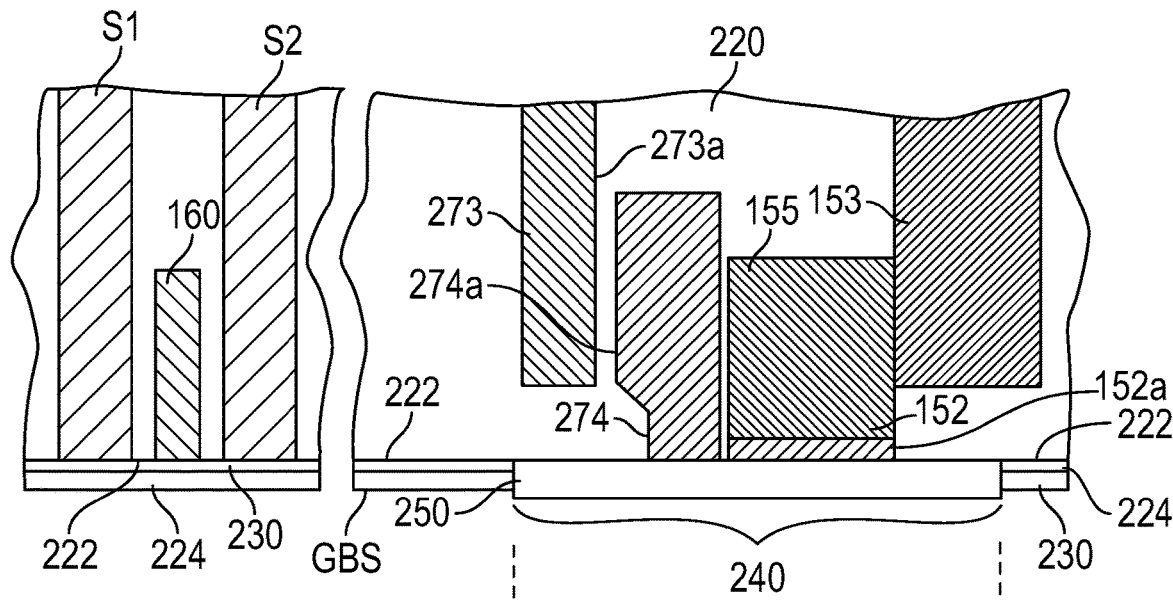
FIG. 3A is a cross-sectional view of a portion of the slider and FIG. 3B is a GBS view of the slider with the protective film on only a window region of the disk-facing surface of the slider according to one embodiment wherein the NFT is a "nanobeak" type NFT with a triangular end with an apex of the triangle forming the NFT tip that faces the write pole end.
Figure 3B:
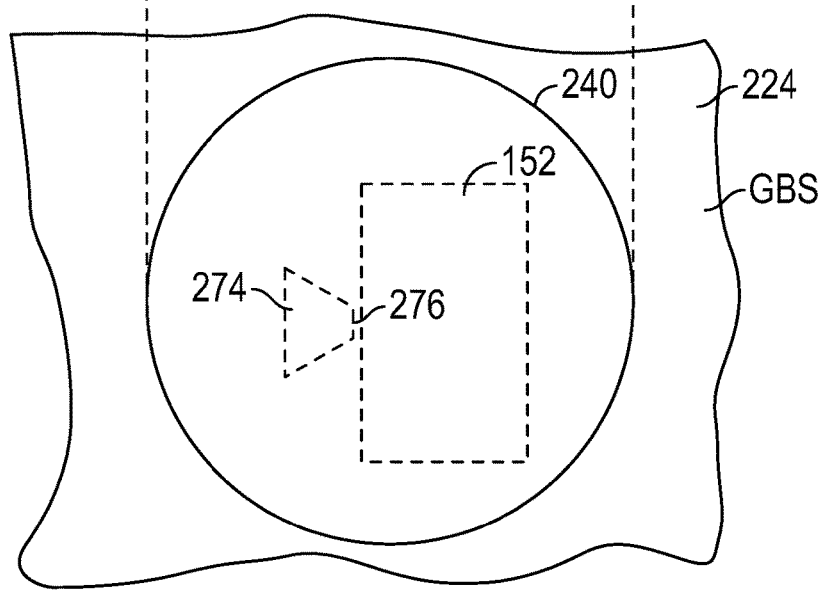

FIG. 3A is a cross-sectional view of a portion of the slider and FIG. 3B is a GBS view of the slider according to one embodiment of the invention. The drawings in FIGS. 3A-3B are not to scale due to the difficulty in representing very small dimensions. The slider 220 has a surface 222 that faces the recording layer on the disk. The slider supports the waveguide 273, NFT 274, main pole 153 and write pole 155 with write pole end 152. The outer surface region 152a of write pole end 152 is chemically passivated. The write pole 155 is typically an alloy of Fe and one or more of Co and Ni. In one embodiment the region 152a is nitrogen rich, predominately as an iron nitride. The NFT in this example is a "nanobeak" type NFT with a triangular end with an apex of the triangle forming the NFT tip 276 that faces the write pole end 152 (FIG. 3B). In this type of NFT, the waveguide 273 has a surface 273a that faces a surface 274a of NFT 274. When light is introduced into the waveguide 273, an evanescent wave is generated at the surface 273a and couples to surface plasmons excited on the surface 274a of NFT 274. The surface plasmons propagate to the output tip 276. The disk-facing surface 222 includes a window region 240 that surrounds both the NFT 274 and write pole end 152. The protective film 250 is located only in the window region 240 and is preferably a material like silicon nitride ($SiN_x$) that is optically transparent and typically different from the material of overcoat 224. In this embodiment the film 250 is directly on the disk-facing surface 222 and is in direct contact with the NFT 274 and outer surface region 152a of write pole end 152. The slider overcoat 224 in the non-window region is typically DLC and may be formed on an undercoat 230, such as a silicon nitride ($SiN_x$) undercoat. The slider overcoat 224 in the non-window region protects the read head 160, which is located between read head shields S1, S2.

Figure 4A:
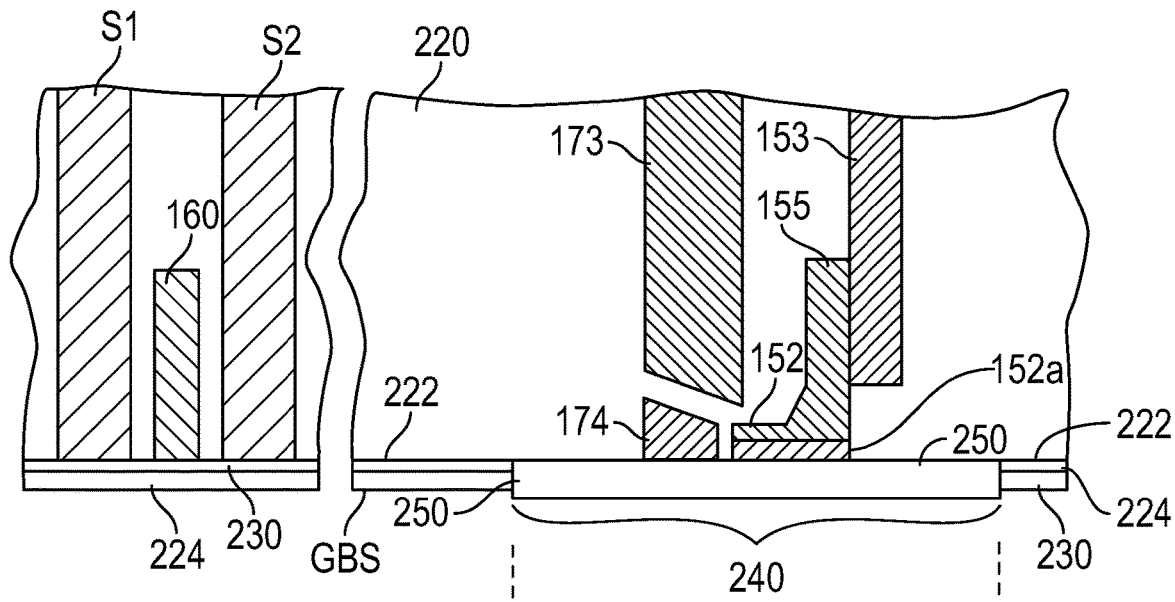
FIG. 4A is a cross-sectional view of a portion of the slider and FIG. 4B is a GBS view of the slider with the protective film on only a window region of the disk-facing surface of the slider according to another embodiment.
Figure 4B:
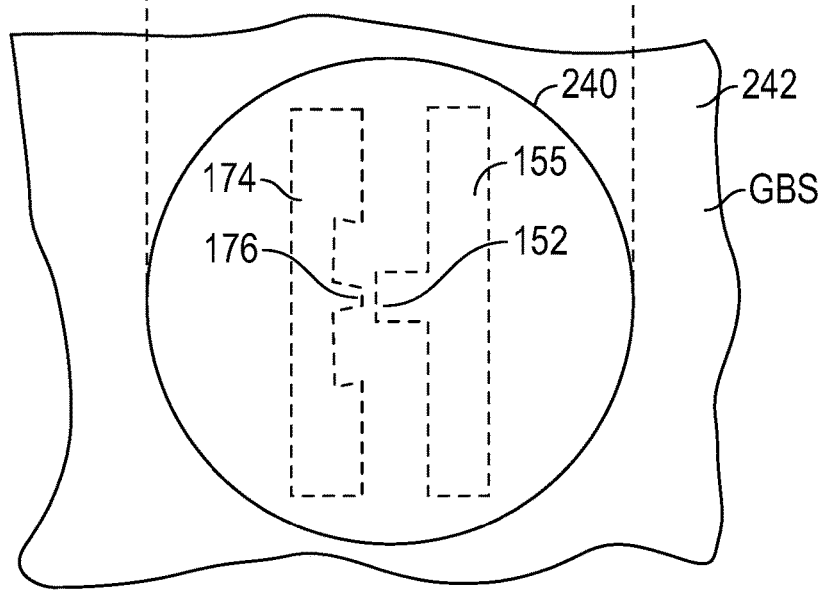

FIG. 4A is a cross-sectional view of a portion of the slider and FIG. 4B is a GBS view of the slider according to another embodiment of the invention. The drawings in FIGS. 4A-4B are not to scale due to the difficulty in representing very small dimensions. The slider 220 has a surface 222 that faces the recording layer on the disk. The slider supports the waveguide 173, NFT 174, main pole 153 and write pole 155. Write pole 155 has end 152 with the chemically passivated outer region 152a at the disk-facing surface 222. The NFT 174 in this example is an E-antenna with a central tip 176 that faces the write pole end 152 (FIG. 4B). In this example the write pole end 152 is a lip that extends from the write pole 155 at the disk-facing surface 222. The disk-facing surface 222 includes a window region 240 that surrounds both the NFT 174 and write pole end 152. The protective film 250 is located only in the window region 240. In this embodiment the film 250 is directly on the disk-facing surface 222 and is in direct contact with the NFT 174 and region 152a of write pole end 152.

In all of the embodiments, the window is depicted as being circular but could have other shapes, provided it covers both the NFT and write pole end. The window cannot be so large as to also cover the read head because the read head, which is typically a magnetic alloy like NiFe, must be shielded during the chemical passivation process that forms the outer region 152a of the write pole end. If the window region is circular, it could, for example, have a diameter in the range of approximately 3-5 μm, which would not affect the read head, which is typically about 6 μm from the write pole end.

Figure 5A:
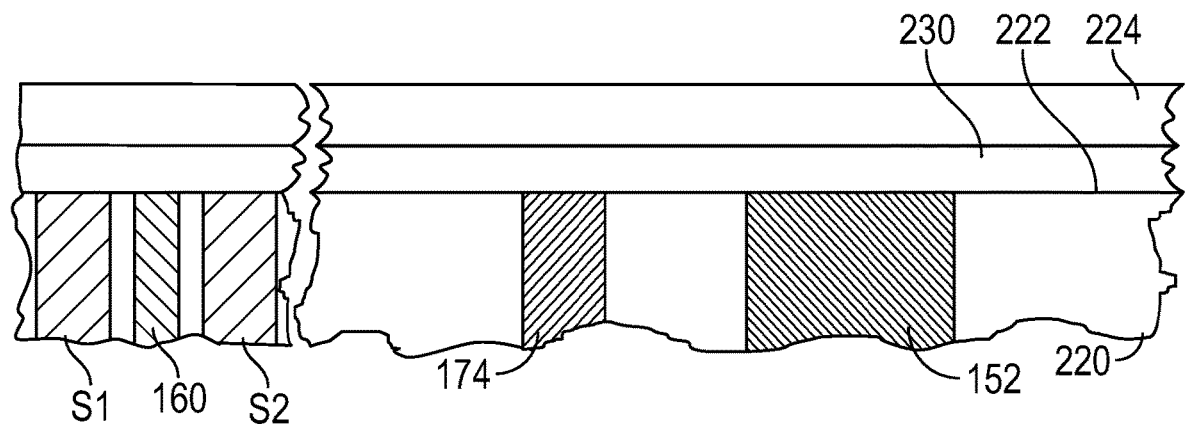
FIGS. 5A-5E are sectional views illustrating the basic process steps in forming the chemically-passivated write pole end and protective film in the window region.
Figure 5B:
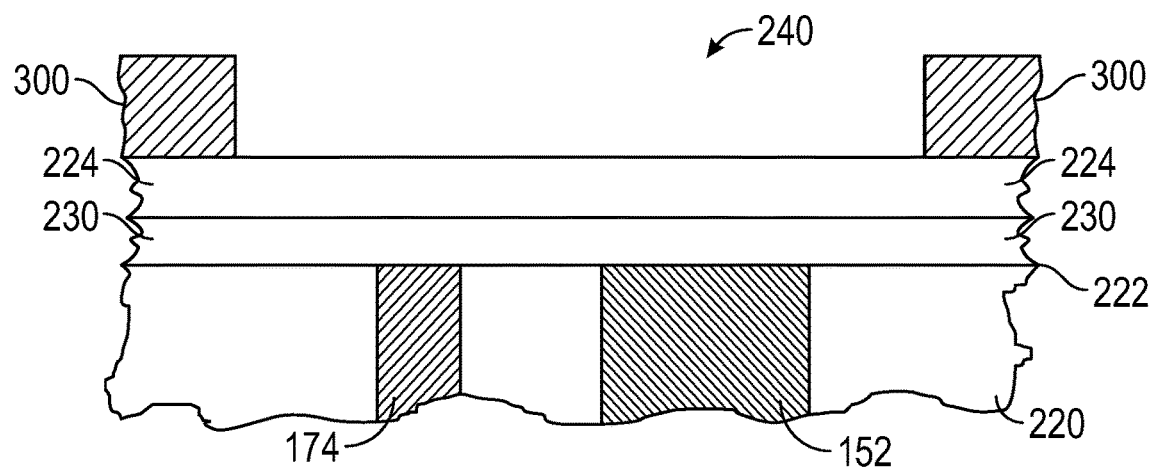

FIGS. 5A-5F are sectional views illustrating the basic process steps in forming the chemically passivated write pole end and protective film in the window region while protecting the read head in the non-window region. In this example the NFT is an E-antenna (FIG. 4B) but the process is fully applicable to a HAMR write head with a nanobeak NFT (FIG. 3B) or other types of NFTs. In FIG. 5A, a silicon or silicon nitride undercoat 230 and an amorphous DLC overcoat 224 have been deposited over the entire surface 222 of slider 220 to cover the write pole end 152 and NFT 174 in what will become the window region, as well as the shields S1, S2 and end of read head 160 in the non-window region. The undercoat 230 may have a thickness between about 1 and 5 Å and the DLC overcoat 224 may have a thickness between about 10 and 20 Å. In FIG. 5B, a resist 300 is deposited over the entire surface of overcoat 224 and then patterned and developed to define the window region 240. The resist may be a liquid resist deposited by spin-coating.

Figure 5C:
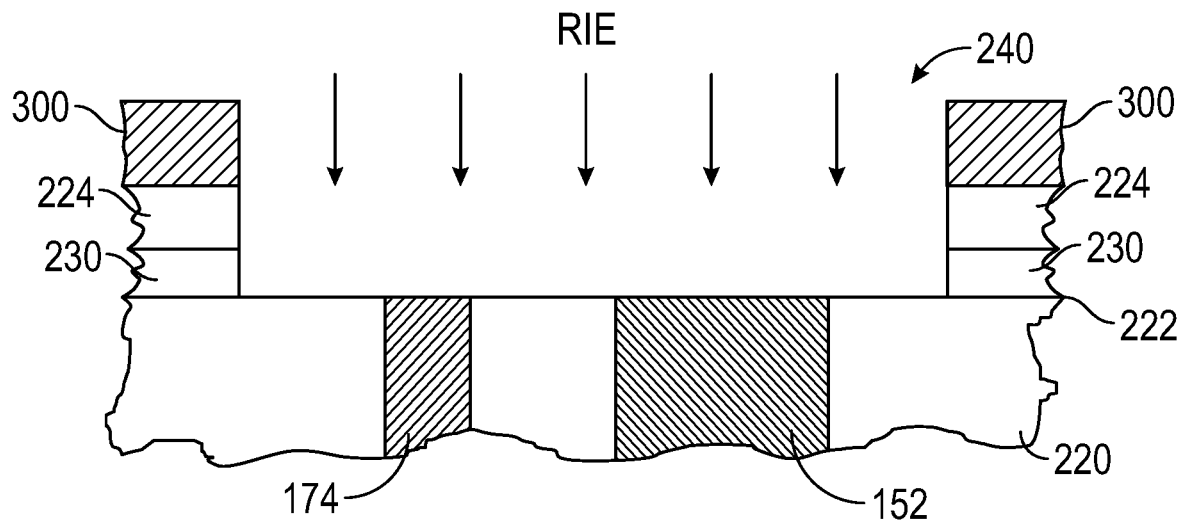

In FIG. 5C the undercoat 230 and slider overcoat 224 in window region 240 are removed, for example by ion beam etching (IBE) like reactive ion etching (ME) in an $Ar-N_2$ or $Ar-O_2$ atmosphere. Because the etch rates of the undercoat 230 and overcoat 224 material are well known, the etching can be terminated at the precise time to remove the overcoat 224 material and all of the undercoat 230 without etching any of the NFT 174 material (typically Au or a Au alloy) or write pole 152 material (typically a CoFe or CoFeNi alloy).

Figure 5D:
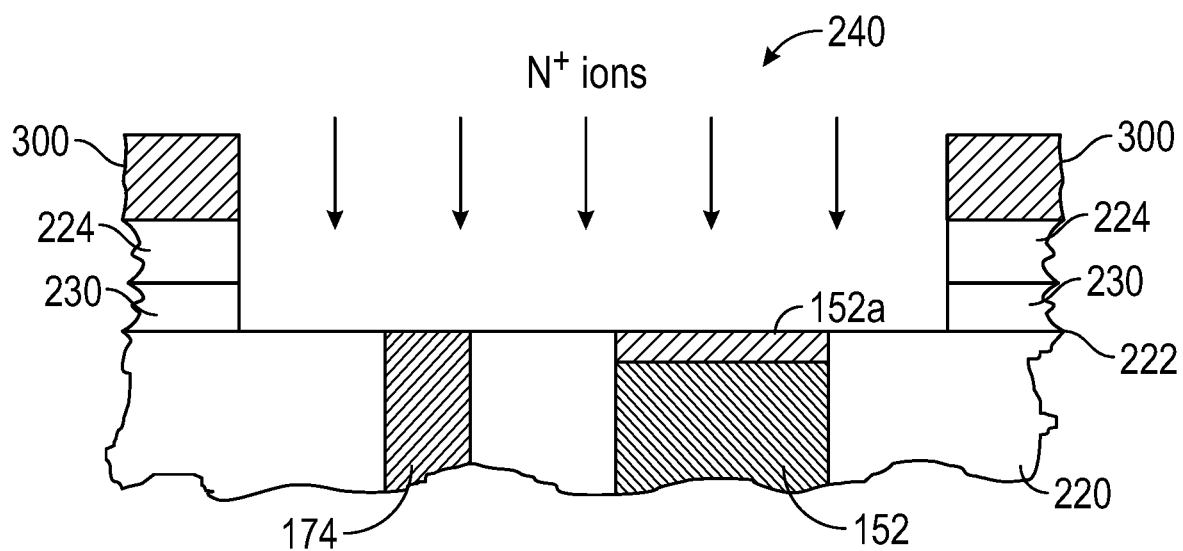

Next, in FIG. 5D, low energy nitrogen ions from an RF plasma tool are directed to a substrate that contains the exposed window regions of the sliders. Preferably the substrate is a row of sliders that have been cut from a wafer and then processed to form a window region on each slider in the row. In the RF plasma tool argon and nitrogen gases become excited under an RF field and break down to generate a plasma of freely-moving negatively charged electrons and positively charged Ar+ and N+ ions. A finite thickness of potential gradient exists on enclosure surfaces, including the substrate, and is referred to as the sheath layer. In one embodiment the grid assembly bias of the RF plasma tool is turned off. The nitrogen ions in the plasma are drawn towards the substrate surface just by the sheath potential difference that is present on the substrate surface. This results in the chemically-passivated outer film or region 152a of the write pole end 152 in each of the sliders. The region 152a is nitrogen-rich and includes nitrogen bound to itself and iron nitrides (e.g., $Fe_2N$, $Fe_3N_4$), and has a thickness typically in the range of 0.5 to 2 nm. However, it has been shown that the nitrogen passivation process has no effect on the NFT end so the NFT performance is not affected. The passivated outer surface region 152a, since it is predominately nitrogen and iron nitride, resists oxidation of the underlying write pole material during disk drive operation. U.S. Pat. No. 7,137,190 B2, assigned to the same assignee as this application, describes nitrogen treatment of all magnetic films on a slider for conventional (non-HAMR) longitudinal (not perpendicular) magnetic recording. Because the magnetoresistive read head also has a nitrogen film formed on it, the readback signal is substantially reduced. Also it is believed that the nitrogen film on the write poles will also adversely affect write performance because in non-HAMR the writing is dependent on the write field gradient, in contrast to HAMR where the write field gradient is much smaller and does not significantly affect writing. In embodiments of the chemical passivation process of the present invention for HAMR, the magnetoresistive read head must be protected because the readback signal is strongly dependent on head-disk spacing, while the write pole is less dependent on head-disk spacing because the write field gradient does not significantly affect writing.

In an alternative embodiment the outer surface of write pole end 152 can be chemically passivated by exposure to oxygen to form a thin oxide film as outer region 152a. The slider with exposed NFT end and write pole end as depicted in FIG. 5D can be exposed to an oxygen plasma or dipped in a solution of hydrogen peroxide (10 to 30 percent concentration) to form the oxidized outer surface. The resulting thin (i.e., 0.5-2 nm) outer oxide surface region 152a prevents further oxidation during operation of the disk drive. In another alternative embodiment the slider with exposed NFT end and write pole end can be exposed to a hydrocarbon gas, like CO, $CH_4$ and $C_2H_8$ that are used to carburize steel. This forms iron carbide (FeC) as the outer surface region 152a. As part of the chemical passivation process, after the outer surface region 152a is formed by any of the above-described methods, the slider can be annealed to expedite or enhance the chemical passivation.

Figure 5E:
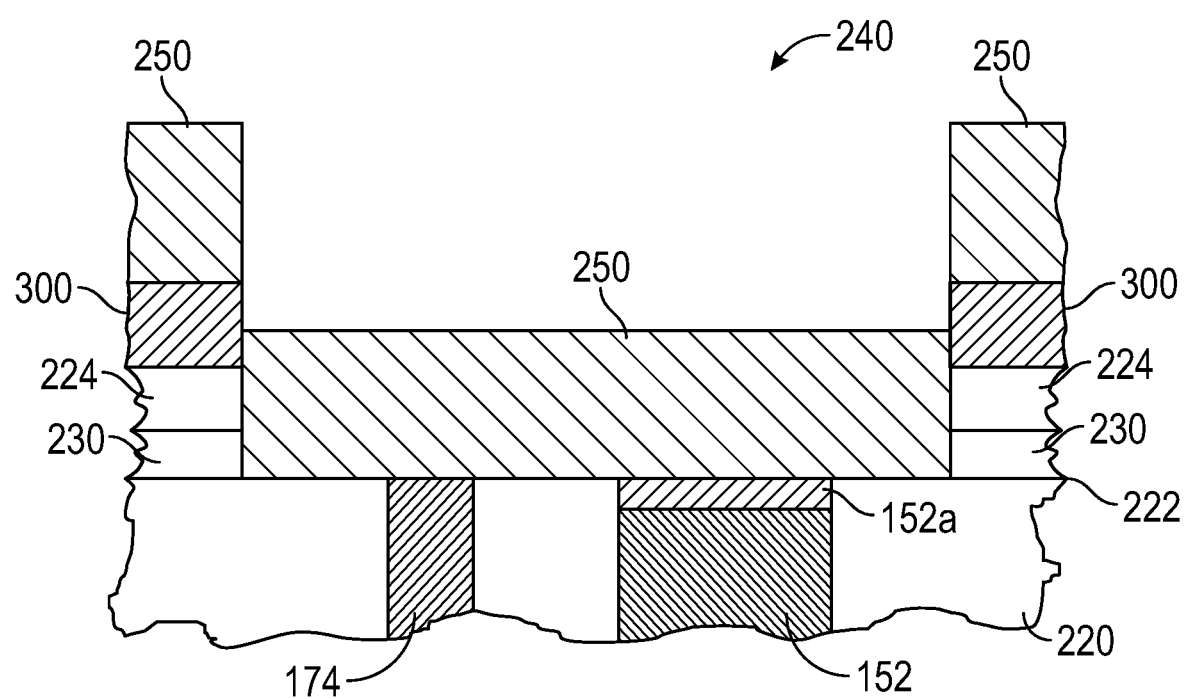

Next, in FIG. 5E a protective film 250 of material that is optically transparent to radiation at the wavelength of the laser, like silicon nitride ($SiN_x$), is deposited in the window region 240. In addition to SiNx, other substantially optically transparent materials may be used for the protective film 250, including $TiO_2$, $ZrO_2$, $HfO_2$, or SiBN. The protective film 250 may be deposited by sputter deposition to a thickness in the range of about 1 to 4 nm. In the preferred embodiment the protective film 250 is deposited to a thickness such that its outer surface extends beyond the outer surface of the overcoat 224 in the non-window region, typically by only about 1 nm. In other embodiments, the protective film 250 may be a multilayer of two or more dissimilar materials that may not be perfectly optically transparent. For example a layer of DLC may be deposited on top of the $SiN_x$ layer. In this case the DLC can be expected to oxidize in the NFT region due to optical heating but may provide added protection on the pole if it remains intact. The resist 300 is then removed, leaving the structure as shown in FIG. 4A.

NiFe alloy coupons with and without nitrogen passivation were tested for corrosion resistance by immersion in a solution of $Na_2B_4O_7$, $B(OH)_3$ and NaCl. NiFe with the nitrogen-rich surface showed substantial better resistance to corrosion over the unprotected NiFe. The NiFe coupons were exposed to nitrogen ions for various times. The corrosion rate decreased with increasing exposure time. For NiFe coupons with a multilayer protective film of 3A $SiN_x$/11 Å DLC the coupons with the nitrogen-rich surface exhibited a corrosion rate about one-tenth the corrosion rate for coupons without the nitrogen-rich surface.

HAMR write heads with the nitrogen-rich surface on the write poles and a SiNx protective film were tested in a spin stand where data is repetitively written and read back until the readback signal becomes unreadable. The lifetime of these heads was about 2.5 times the lifetime for conventional HAMR write heads without the nitrogen passivated write poles.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) head for writing to a magnetic recording layer comprising:
   a head carrier having a recording-layer-facing surface;
   a write pole on the head carrier and formed of a material comprising Fe and one or more of Co and Ni, the write pole having an end at the recording-layer-facing surface, the write pole material at the write pole end being chemically-passivated;
   an optical waveguide on the head carrier for receipt of laser radiation;
   a near-field transducer (NFT) on the head carrier for optical coupling with the waveguide, the NFT having an output end at the recording-layer-facing surface facing the write pole end;
   a magnetoresistive read head on the head carrier having an end at the recording layer surface;
   a protective film on only a window region of the recording-layer-facing surface, the window region including the NFT end and write pole end but not the read head end; and
   an overcoat on the non-window region of the recording-layer-facing surface.

2. The HAMR head of claim 1 wherein the write pole material at the write pole end comprises an element selected from nitrogen, oxygen and carbon.

3. The HAMR head of claim 2 wherein the write pole material at the write pole end comprises one or more iron nitrides.

4. The HAMR head of claim 2 wherein the write pole material at the write pole end comprises a carbide or one or more oxides.

5. The HAMR head of claim 1 wherein the chemically-passivated write pole material at the write pole end has a thickness greater than or equal to 0.5 nm and less than or equal to 2 nm.

6. The HAMR head of claim 1 wherein the protective film in the window region comprises a silicon nitride.

7. The HAMR head of claim 1 wherein the protective film in the window region has an outer surface that extends beyond the outer surface of the overcoat in the non-window region.

8. The HAMR head of claim 1 wherein the protective film in the window region comprises a multilayer of two or more dissimilar materials.

9. The HAMR head of claim 1 wherein the overcoat in the non-window region comprises amorphous diamond-like carbon (DLC).

10. The HAMR head of claim 1 wherein the NFT end is selected from a nanobeak antenna having a generally triangular shaped output tip with an apex of the triangle facing the write pole end, and an E-antenna having a center output tip facing the write pole end.

11. A heat-assisted recording (HAMR) disk drive comprising:
    the HAMR head of claim 1;
    a laser for directing light to the waveguide; and
    a magnetic recording disk having a magnetic recording layer.

12. A heat-assisted magnetic recording (HAMR) head for reading from and writing to a magnetic recording layer on a magnetic recording disk comprising:
    a gas-bearing slider having a disk-facing surface for facing the magnetic recording layer on the disk,
    a write pole on the slider and comprising Fe and one or more of Co and Ni, the write pole having an end at the disk-facing surface comprising nitrogen;
    an optical waveguide on the slider for receipt of laser radiation;
    a near-field transducer (NFT) on the slider for optical coupling with the waveguide, the NFT having an output tip at the disk-facing surface facing the write pole end;
    a magnetoresistive read head on the slider having an end at the disk-facing surface;
    a substantially optically transparent protective film on only a window region of the recording-layer-facing surface, the window region including the NFT tip and write pole end but not the read head end; and
    an amorphous diamond-like carbon (DLC) overcoat on the non-window region of the disk-facing surface, the outer surfaces of the overcoat and protective film forming a gas-bearing surface (GBS) of the slider.

13. The HAMR head of claim 12 wherein the write pole end comprises one or more iron nitrides.

14. The HAMR head of claim 12 wherein the write pole material end has a thickness greater than or equal to 0.5 and less than or equal to 2 nm.

15. The HAMR head of claim 12 wherein the protective film in the window region comprises a silicon nitride.

16. The HAMR head of claim 12 wherein the protective film in the window region has an outer surface that extends beyond the outer surface of the overcoat in the non-window region.

17. The HAMR head of claim 12 wherein the NFT is selected from a nanobeak antenna having a generally triangular shaped output tip with an apex of the triangle facing the write pole end, and an E-antenna having a center output tip facing the write pole end.

18. A heat-assisted recording (HAMR) disk drive comprising:
   the HAMR head of claim 13;
   a laser for directing light to the waveguide; and
   a magnetic recording disk having a magnetic recording layer.

19. A method for chemically passivating the end of a write pole on the disk facing surface of a gas-bearing slider, the slider having a magnetoresistive read head end, a near-field transducer (NFT) end and a write pole end at the disk-facing surface, the method comprising:

forming a window region on the disk-facing surface that includes the NFT end and write pole end but excludes the read head end;
   protecting the read head end in a non-window region of the disk-facing surface;
   exposing the NFT end and write pole end in the window region to an element selected from nitrogen, oxygen and carbon to form a passivated outer surface region of the write pole end; and
   depositing a protective film over the NFT end and passivated write pole end in the window region.

20. The method of claim 19 wherein exposing the NFT end and write pole end to nitrogen comprises exposing the NFT end and write pole end to a nitrogen plasma to form one or more nitrides on the write pole end.

21. The method of claim 19 further comprising, after said exposing step, annealing the slider.

* * * * *